(12) United States Patent
Minegishi et al.

(10) Patent No.: US 10,613,531 B2
(45) Date of Patent: Apr. 7, 2020

(54) VEHICLE DRIVE ASSISTANCE SYSTEM

(71) Applicant: Mazda Motor Corporation, Aki-gun, Hiroshima (JP)

(72) Inventors: Yuka Minegishi, Hatsukaichi (JP); Keiichi Tomii, Hiroshima (JP); Takahiro Tochioka, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 137 days.

(21) Appl. No.: 15/902,125

(22) Filed: Feb. 22, 2018

(65) Prior Publication Data

US 2018/0284767 A1 Oct. 4, 2018

(30) Foreign Application Priority Data

Mar. 30, 2017 (JP) .................. 2017-068381

(51) Int. Cl.
| | |
|---|---|
| *G05D 1/00* | (2006.01) |
| *B60W 40/08* | (2012.01) |
| *B60W 50/14* | (2020.01) |
| *G05D 1/02* | (2020.01) |
| *B60W 50/00* | (2006.01) |

(52) U.S. Cl.
CPC ........... *G05D 1/0061* (2013.01); *B60W 40/08* (2013.01); *B60W 50/14* (2013.01); *G05D 1/0088* (2013.01); *G05D 1/0274* (2013.01); *B60W 2040/0818* (2013.01); *B60W 2040/0872* (2013.01); *B60W 2050/0089* (2013.01); *B60W 2050/146* (2013.01); *B60W 2510/20* (2013.01); *B60W 2540/22* (2013.01); *B60W 2550/10* (2013.01); *B60W 2550/20* (2013.01); *B60W 2710/06* (2013.01); *B60W 2710/18* (2013.01); *B60W 2710/20* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 5,732,371 | A * | 3/1998 | Fujita | B60G 17/0185 303/146 |
| 9,233,692 | B2 * | 1/2016 | Zagorski | B62D 6/003 |
| 9,852,625 | B2 * | 12/2017 | Victor | G09B 19/16 |

(Continued)

FOREIGN PATENT DOCUMENTS

| | | | |
|---|---|---|---|
| CN | 105788337 A | * | 7/2016 |
| JP | 2015110417 A | | 6/2015 |

*Primary Examiner* — Shelley Chen
(74) *Attorney, Agent, or Firm* — Alleman Hall Creasman & Tuttle LLP

(57) ABSTRACT

A vehicle drive assistance system is provided, which includes a control unit configured to perform a drive assistance control based on a balance state between a driver's required driving ability required for driving a vehicle based on a traffic environment around the vehicle and drive assistance which is provided to the driver by the vehicle, and a driver's current driving ability. The control unit includes a processor configured to execute a balance determining module to determine the balance state between the required driving ability and the current driving ability based on a physical quantity related to a driving operation by the driver.

10 Claims, 13 Drawing Sheets

(56) References Cited

U.S. PATENT DOCUMENTS

| | | | |
|---|---|---|---|
| 2009/0076665 A1* | 3/2009 | Hoisington | G05D 1/0044 701/2 |
| 2014/0039986 A1* | 2/2014 | Handley | G06Q 10/0639 705/7.42 |
| 2015/0251664 A1* | 9/2015 | Zagorski | B62D 6/003 701/41 |
| 2015/0262484 A1* | 9/2015 | Victor | G09B 19/16 701/1 |
| 2017/0206717 A1* | 7/2017 | Kuhnapfel | H04L 67/22 |

* cited by examiner

| LARGE CLASS | MIDDLE/SMALL CLASS | | PROCESSING (EXAMPLE) |
|---|---|---|---|
| D UP | INFO-RELATED (+1 TO +5) | BIRD'S-EYE INFO PRESENTATION | MAP SCALE-DOWN DISPLAY |
| | | INFO AMOUNT INCREASE | DETAILED DISPLAY, DRIVE ASSISTANCE ALARM ISSUANCE |
| | | LINE-OF-SIGHT LEADING | LINE-OF-SIGHT LEADING OFF |
| | AUTONOMOUS DRIVE (+1 TO +10) | | AUTO DRIVE ASSISTANCE MODE OFF, THRESHOLD CHANGE |
| | OTHER (+1 TO +5) | | DIFFICULT ROUTE SETTING, VOLUME DOWN |
| D DOWN | INFO-RELATED (-1 TO -5) | LOCAL INFO PRESENTATION | MAP SCALE-UP DISPLAY |
| | | INFO AMOUNT REDUCTION | SIMPLIFIED DISPLAY |
| | | LINE-OF-SIGHT LEADING | LINE-OF-SIGHT LEADING ON |
| | AUTONOMOUS DRIVE (-1 TO -10) | | AUTO DRIVE ASSISTANCE MODE ON, THRESHOLD CHANGE |
| | OTHER (-1 TO -5) | | LANE CHANGE VOICE GUIDANCE, BREAK, SUN-VISOR, VOLUME UP |

| LARGE CLASS | PROCESSING (EXAMPLE) |
|---|---|
| P UP (+1 TO +5) | MUSIC, SCENT, BREAK |
| P DOWN (-1 TO -5) | xxxx xxx xxx xxx xxx |

VEHICLE DRIVE ASSISTANCE SYSTEM

TECHNICAL FIELD

The present disclosure relates to a vehicle drive assistance system, and particularly to a vehicle drive assistance system that provides drive assistance according to a driving workload and a driving skill.

BACKGROUND OF THE DISCLOSURE

For example, JP2015-110417A discloses a drive assistance device that increases a degree of assistance of a driving operation (e.g., a degree of assistance when parking) when a driving skill of a vehicle driver is insufficient against a required level corresponding to an environmental difficulty based on an outside environment.

However, since it is difficult to accurately estimate the driving workload (e.g., environmental difficulty) and the driving skill with the drive assistance device, suitable drive assistance may not be provided.

SUMMARY OF THE DISCLOSURE

The present disclosure is made in view of solving the issues described above, and aims to provide a drive assistance system, which accurately estimates a relationship between a driving workload and a driving skill.

According to one aspect of the present disclosure, a vehicle drive assistance system is provided, which includes a control unit configured to perform a drive assistance control based on a balance state between a driver's required driving ability required for driving a vehicle based on a traffic environment around the vehicle and drive assistance which is provided to the driver by the vehicle, and a driver's current driving ability. The control unit includes a processor configured to execute a balance determining module to determine the balance state between the required driving ability and the current driving ability based on a physical quantity related to a driving operation by the driver.

With the above configuration, the balance state between the required driving ability and the current driving ability is determined based on the physical quantity related to the driving operation actually executed by the driver. Thus, the balance state between the required driving ability and the current driving ability is determined more accurately.

For example, the physical quantity may be a difference between a reference traveling route defined at least by a position calculated based on the traffic environment, and an actual traveling route on which the vehicle actually traveled in the traffic environment.

Further, when a fluctuation of the difference between the reference traveling route and the actual traveling route over time is smaller than a given threshold, the balance determining module may determine that the required driving ability and the current driving ability are in balance.

Furthermore, the balance determining module may set a base line of the difference based on a fluctuation of the difference between the reference traveling route and the actual traveling route over time in traveling for one of a given period of time and a given distance, and determine the balance state based on the base line and the difference.

When the base line differs from the difference by less than a given threshold, the balance determining module may determine that the required driving ability and the current driving ability are in balance. The base line may be set when the vehicle travels a given traveling route. The given traveling route may include a plurality of different traveling routes, and the base line may be set for each traveling route.

In addition, the balance determining module may be further configured to determine the travel safety of the vehicle to be lower as a difference between the reference traveling route and the actual traveling route is larger. When a fluctuation of the difference between the reference traveling route and the actual traveling route over time is smaller than a given threshold, the balance determining module may determine that the required driving ability and the current driving ability are in balance.

Further, the physical quantity may be an upper body position of the driver, a steering angle of a steering wheel, or a visual confirmation performing state of the driver on an obstacle outside the vehicle. The balance determining module may determine the balance state between the required driving ability and the current driving ability based on a fluctuation of the physical quantity over time.

In addition, the processor may be further configured to execute an assistance executing module to perform the drive assistance control so that the required driving ability and the current driving ability come in balance, based on the determined balance state.

According to the vehicle drive assistance system of the present disclosure, a relationship between a driving workload and a driving skill is estimated accurately.

BRIEF DESCRIPTION OF THE DRAWINGS

FIG. 6 is a diagram illustrating a change table (driving demand) according to the embodiment of the present disclosure.

FIG. 7 is a diagram illustrating a change table (driving performance) according to the embodiment of the present disclosure.

DETAILED DESCRIPTION OF THE DISCLOSURE

Figure 1:
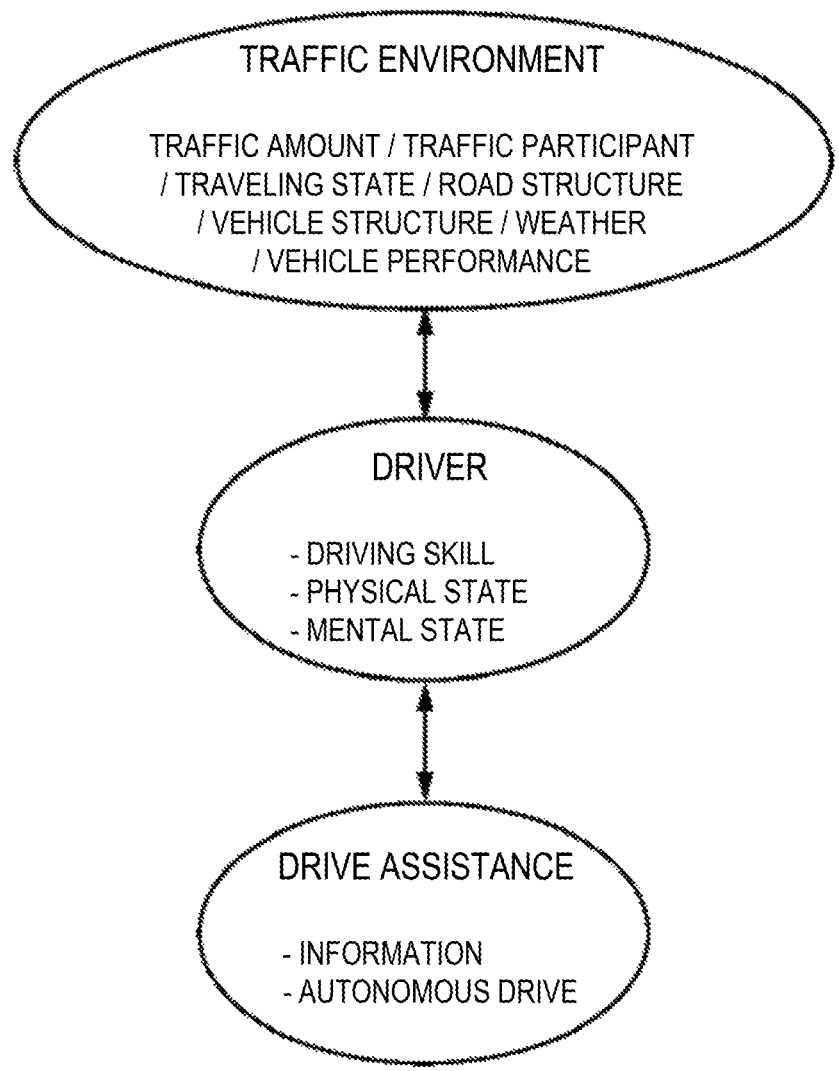
FIG. 1 is a diagram illustrating a relationship among a traffic environment, a driver and drive assistance according to one embodiment of the present disclosure.
Figure 2:
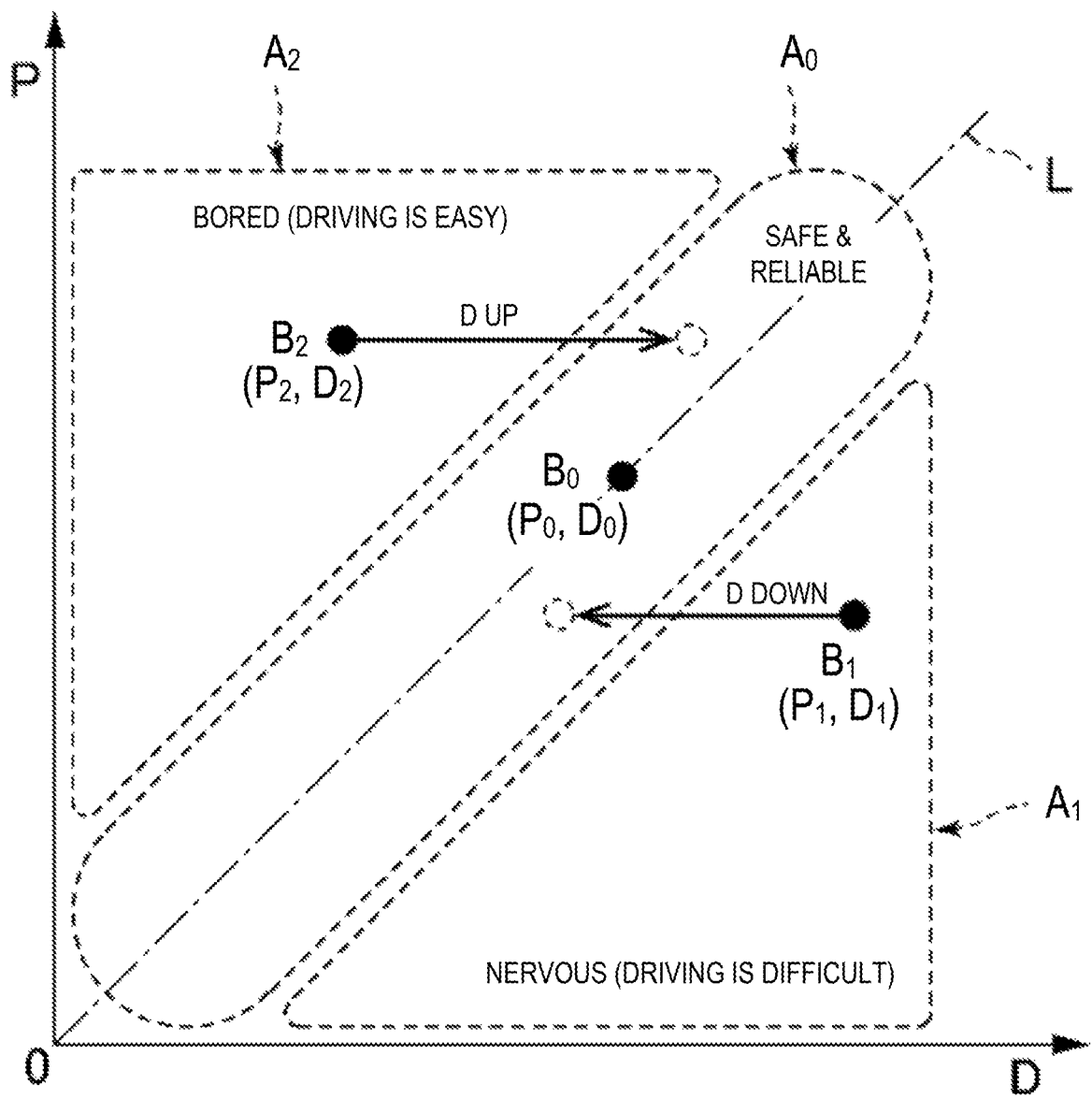
FIG. 2 is a chart illustrating a relationship between a driving demand and a driving performance according to the embodiment of the present disclosure.

Hereinafter, a vehicle drive assistance system according to one embodiment of the present disclosure is described with reference to the accompanying drawings. First, a driving demand and a driving performance used in the vehicle drive assistance system are described with reference to FIGS. 1 and 2. FIG. 1 is a diagram illustrating a relationship among a traffic environment, a vehicle driver and drive assistance, and FIG. 2 is a chart illustrating a relationship between the driving demand and the driving performance.

As illustrated in FIG. 1, the driver is required to drive a vehicle to adapt to the traffic environment. The traffic environment involves various elements, such as a traffic amount (e.g., an intersection with a large traffic amount), a road structure (e.g., a road width and complexity of crossroads), weather (e.g., a wet road surface), a traffic participant (e.g., a child rushing out), a traveling state (e.g., a distance from the vehicle to another vehicle), a vehicle structure (e.g., a difference between an AT vehicle and an MT vehicle, and the size of the vehicle), and vehicle performance (e.g., brake functionality). Therefore, according to the various elements of the traffic environment, the driver is required to have sufficient driving ability for adapting to the traffic environment (e.g., a careful steering operation, an attention to a rush-out of traffic participants, an attention to behaviors of other vehicles, and an attention to a blind angle).

Further, the driver receives various kinds of drive assistance from various on-board devices. The drive assistance mainly includes a drive assistance regarding information presentation (information-related drive assistance) and a drive assistance by an autonomous drive control system (autonomous drive assistance). These kinds of drive assistance lower the driving ability required for the traffic environment. In this embodiment, by taking into consideration this lowered amount by the drive assistance, the actual required driving ability for the traffic environment is defined as driving demand D (required driving ability).

Driving demand $D$=Traffic environment factor $Dt$–Drive assistance factor $Da$

Drive assistance factor $Da$=Information-related factor $Di$+Autonomous driving factor $Dd$ Meanwhile, the driver has a driving skill (technique) for driving the vehicle, adapting to such a traffic environment. However, the driving skill may not always be demonstrated fully depending on a physical (body) state or a mental (mind) state of the driver. In this embodiment, the driving ability actually demonstrated at a current timing based on the driving skill, the physical state, and the mental state is defined as driving performance P (current driving ability).

Driving performance $P$=Driving skill factor $Ps$–Physical factor $Pp$–Mental factor $Pm$ FIG. 2 illustrates the relationship between the driving demand D and the driving performance P. Within an area $A_1$ (e.g., point $B_1$), the driving demand D is higher than the driving performance P (P<D). As the difference between P and D increases, the driving workload increases, which causes the driver to feel that driving is difficult and thus he/she easily feels nervous. Additionally, the driver feels stressed within the area $A_1$, thus he/she easily feels fatigued. Therefore, it is not suitable for driving for a long time.

Within an area $A_2$ (e.g., point $B_2$), the driving performance P is higher than the driving demand D (P>D). As the difference between P and D increases, the driving workload decreases, which causes the driver to feel that driving is easy, thus he/she easily feels unsatisfied or bored. When the driver feels bored, he/she may perform a secondary task (e.g., an action/operation other than driving) such as being inattentive to the driving, be distracted and become less focused on driving, or be less motivated to drive. Thus, the driving performance may degrade.

On a straight line L and its peripheral area $A_0$ (e.g., point $B_0$), the driving demand D and the driving performance P are in balance (ideal state; P=D). In this balanced state, enjoyment and safety of the driving operation are obtained and reliability toward the vehicle is easily built.

Therefore, in this embodiment, when a relation point between the driving performance P and the driving demand D (a relationship between the driver and the traffic environment) is estimated to be located within the area $A_1$ or the area $A_2$, D (or P if needed) is adjusted to move this relation point into the area $A_0$. For example, in the case of the point $B_1$ ($P_1<D_1$), processing of reducing D and/or processing of increasing P is performed, and in the case of the point $B_2$ ($P_2>D_2$), processing of increasing D and/or processing of reducing P is performed.

In the reduction processing of the driving demand D, mainly the information-related factor Di and the autonomous driving factor Dd are increased. In the increase processing of the driving demand D, on the contrary, mainly the information-related factor Di and the autonomous driving factor Dd are reduced. In the increase processing of the driving performance P, the lowered amount of the driving ability caused by the physical factor Pp and the mental factor Pm is reduced, in other words, the amount of the driving performance P degraded by the physical factor Pp and the mental factor Pm is reduced.

Next, a configuration of the vehicle drive assistance system is described with reference to FIG. 3, which is a block diagram of the vehicle drive assistance system.

Figure 3:
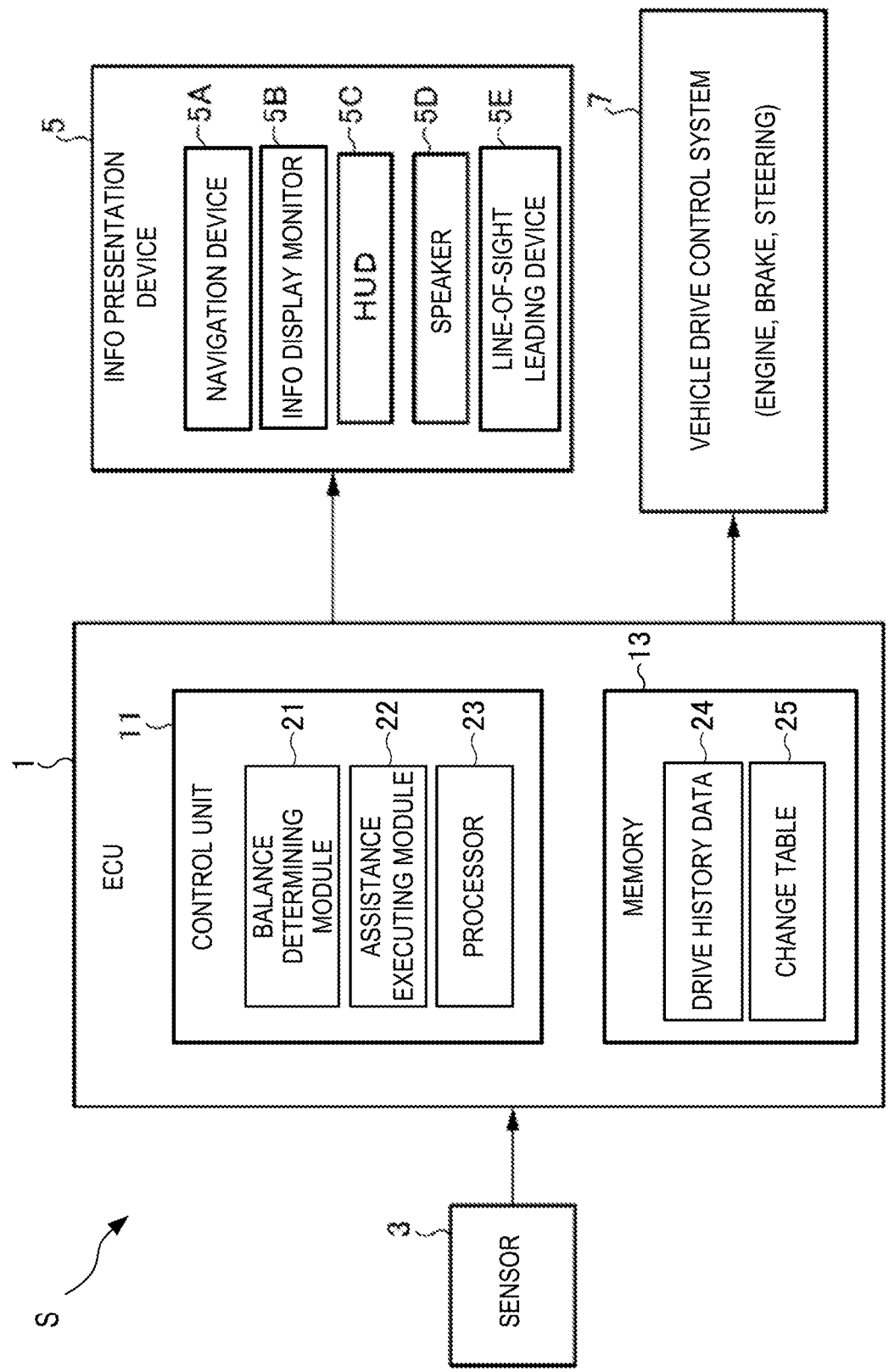
FIG. 3 is a block diagram of a vehicle drive assistance system according to the embodiment of the present disclosure.

As illustrated in FIG. 3, a vehicle drive assistance system S includes an on-board controller 1 (ECU (Electronic Control Unit)), a vehicle sensor 3, an information presentation device 5, and a vehicle drive control system 7.

The on-board controller 1 includes a control unit 11, memory 13 and a communication unit (not illustrated), and controls the information presentation device 5 and the vehicle drive control system 7 based on sensor data acquired from the vehicle sensor 3. For example, the on-board controller 1 controls an engine output via the vehicle drive control system 7 based on an accelerator opening (sensor data).

The vehicle sensor 3 is comprised of various information acquiring devices. The vehicle sensor 3 includes an in-vehicle camera 3a, a biological sensor, a microphone, an external camera, a radar, a navigation device, a vehicle behavior sensor, a driver operation detection sensor, an inter-vehicle communicator, and a vehicle-to-infrastructure communicator.

The in-vehicle camera captures images of the driver and other passenger(s) in the vehicle, and outputs in-vehicle image data.

The biological sensor measures a heart rate, pulse, sweat, electroencephalogram, etc. of the driver, and outputs biological data.

The microphone collects voices of the driver and the other passenger(s), and outputs voice data.

The external camera captures images of the front, left, right and rear sides of the vehicle, and outputs external image data.

The radar emits radio waves, sound waves or laser light toward the front, left, right and rear sides of the vehicle, receives reflection waves from an object located around the vehicle (a preceding vehicle, another vehicle, a pedestrian, a fixed object on the ground, an obstacle, etc.), and outputs external object data of a relative position, relative speed, etc. of the object (e.g., a position, relative speed, etc. of the preceding vehicle).

The navigation device acquires the vehicle position information and outputs navigation data (a plurality of route information, route information selected by the driver, etc.) in combination with internal map information, and traffic jam information acquired externally, and input information (destination, way point, etc.).

The vehicle behavior sensor and the driver operation detection sensor include a speed sensor, a longitudinal acceleration sensor, a lateral acceleration sensor, a yaw rate sensor, an accelerator opening sensor, an engine speed sensor, an AT gear position sensor, a brake switch sensor, a brake hydraulic pressure sensor, a steering angle sensor, a steering torque sensor, a turn signal switch position sensor, a wiper switch position sensor, a light switch position sensor, internal and external temperature sensors, etc.

The inter-vehicle communicator and the vehicle-to-infrastructure communicator acquire communication data from other vehicles, and traffic data (traffic jam information, speed limit information, etc.) from the traffic infrastructure, and output them.

The information presentation device 5 includes a plurality of devices. The information presentation device 5 includes a navigation device 5A, an information display monitor 5B provided in an instrument panel, a HUD (Head-Up Display) 5C provided on a dashboard, a speaker 5D, a line-of-sight leading device 5E, a lamp provided to a meter, etc. The information display monitor 5B displays warning information, driving operation coaching information, driving operation advice information, etc. The HUD 5C displays projections of speed information and other information on a windshield. The speaker 5D outputs voice guidance according to output signals of the on-board controller 1 and an audio device. The line-of-sight leading device 5E leads the line of sight of the driver to an area far ahead of the vehicle.

The vehicle drive control system 7 controls an engine, a brake, and a steering drive device. In various autonomous drive assistance modes, the engine, the brake, and the steering device are automatically operated via the vehicle drive control system 7.

The autonomous drive assistance modes typically include a lane keeping assistance mode, an automatic speed control mode, and a preceding vehicle following mode.

In the lane keeping assistance mode, the steering drive device is automatically controlled to prevent the vehicle from deviating from a traffic lane.

In the automatic speed control mode, an engine drive device is automatically controlled to keep the vehicle traveling at a given speed.

In the preceding vehicle following mode, the engine drive device is automatically controlled to follow the preceding vehicle while keeping a given inter-vehicle distance. In this mode, the steering drive device is also automatically controlled so as to travel through the center of the traffic lane.

Figure 4:
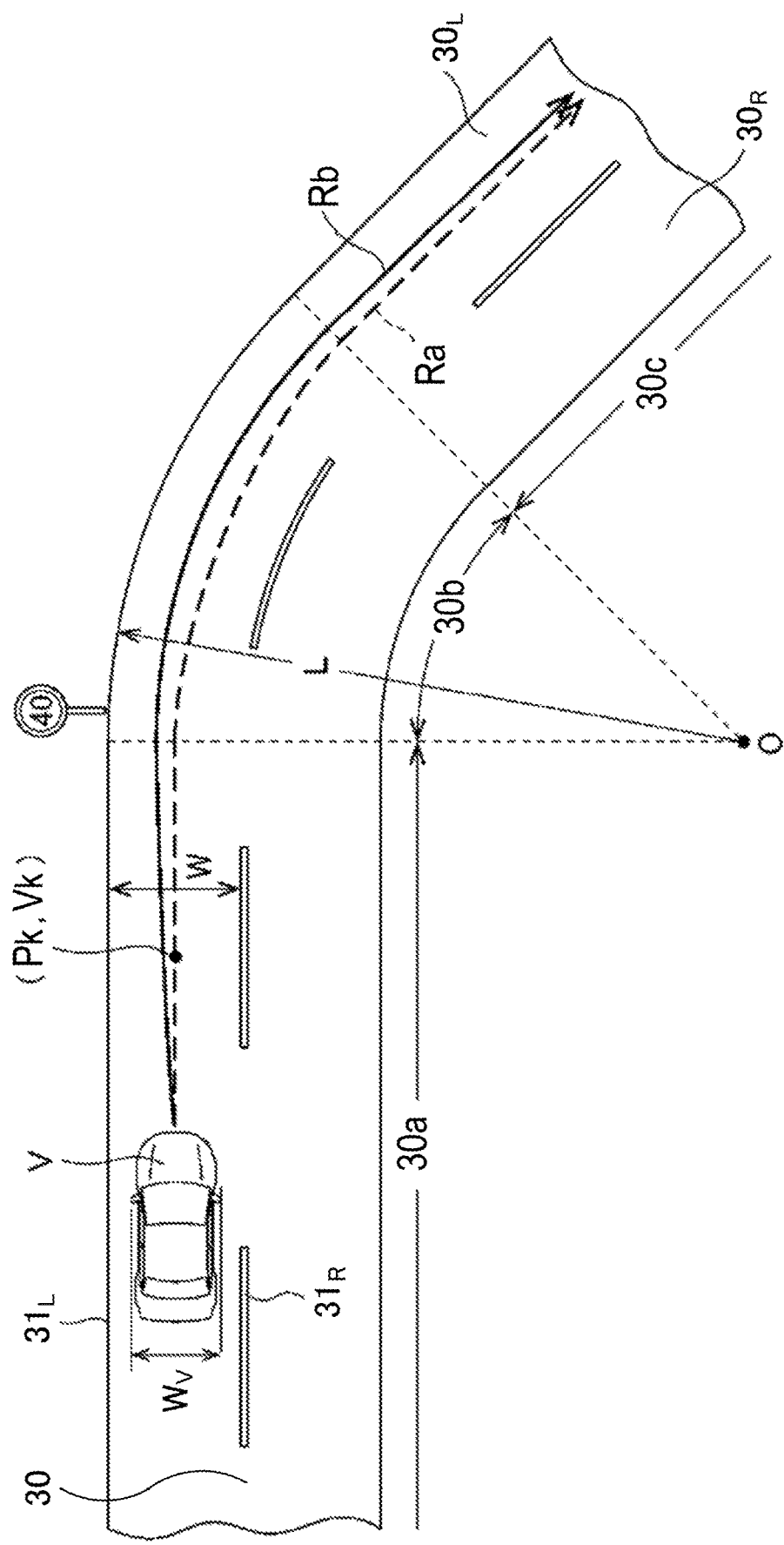
FIG. 4 is a diagram illustrating a traveling route calculation according to the embodiment of the present disclosure.
Figure 5:
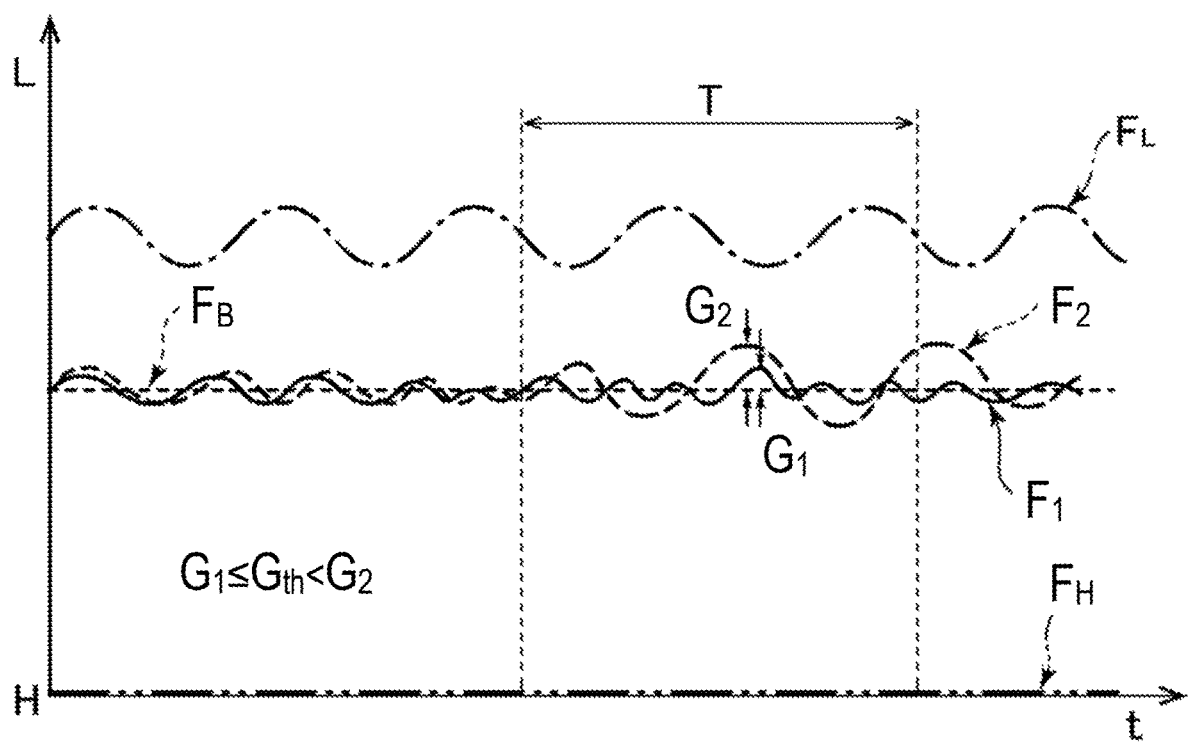
FIG. 5 is a diagram illustrating a time fluctuation chart of a travel safety index according to the embodiment of the present disclosure.
Figure 8:
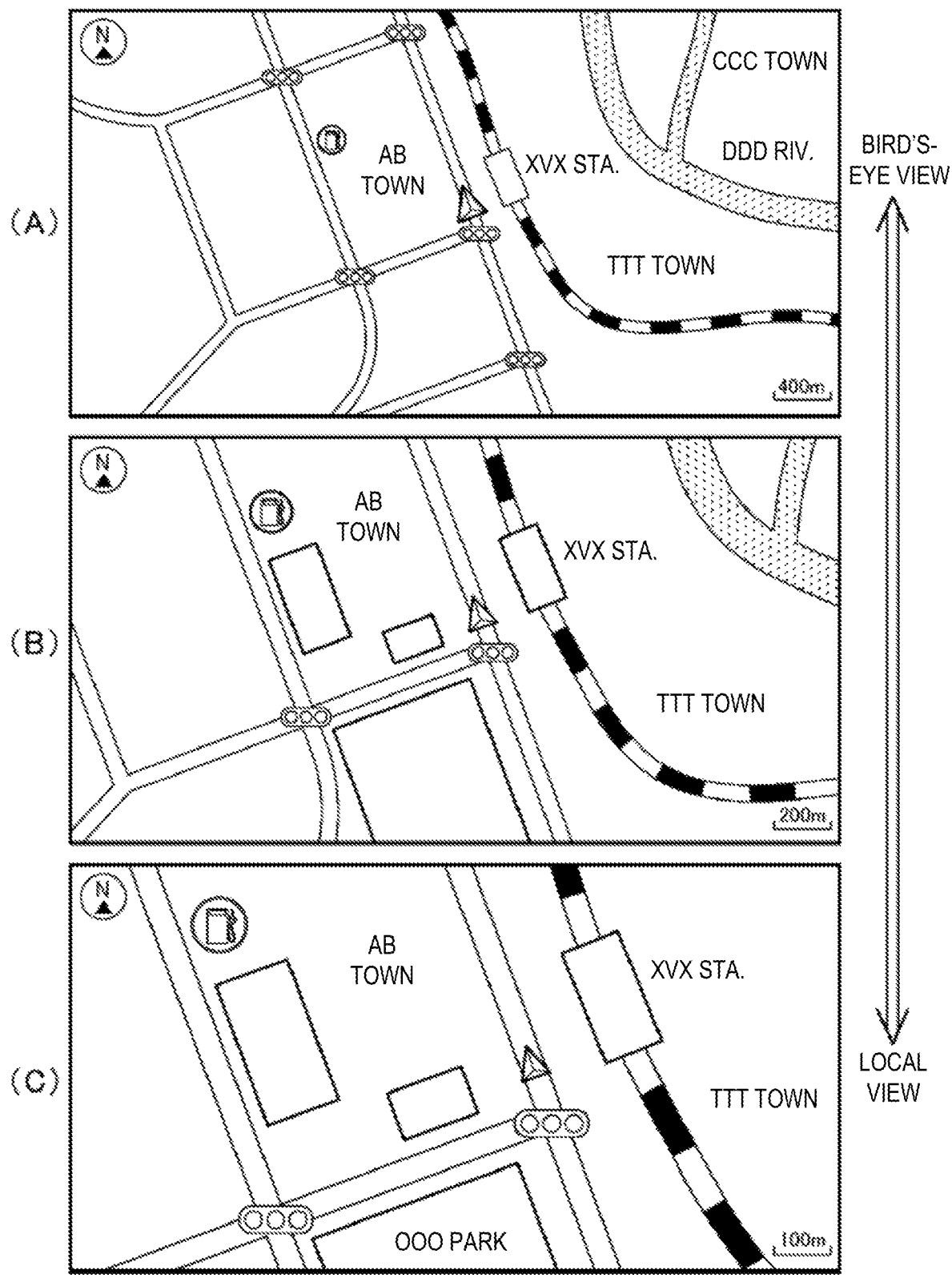
FIG. 8 shows views illustrating changes in a display mode of a navigation map according to the embodiment of the present disclosure.
Figure 9:
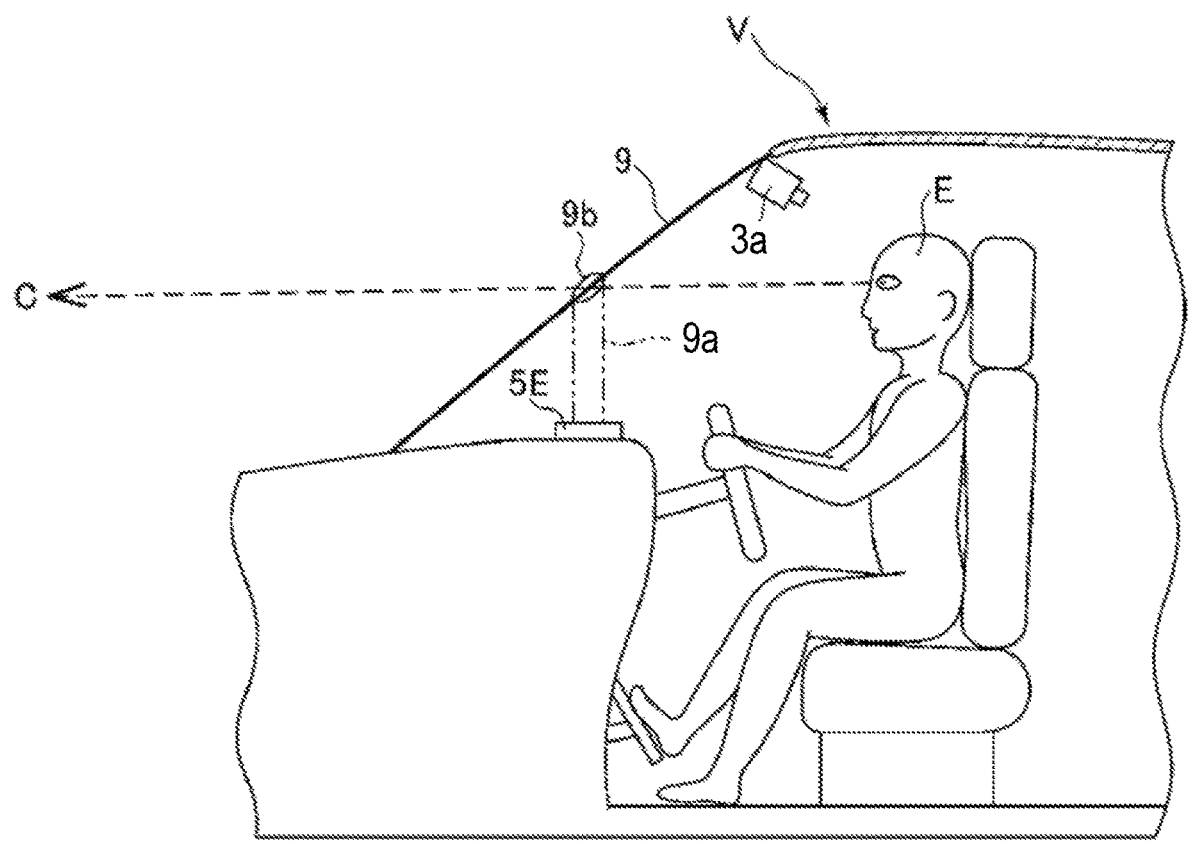
FIG. 9 is a diagram illustrating line-of-sight leading processing according to the embodiment of the present disclosure.

Next, a drive assist function of the on-board controller is described with reference to FIGS. 3 to 9. FIG. 4 is a diagram illustrating a traveling route calculation, FIG. 5 is a time fluctuation chart of a travel safety index, FIGS. 6 and 7 are diagrams illustrating change tables, FIG. 8 shows views illustrating changes in a display mode of a navigation map, and FIG. 9 is a diagram illustrating line-of-sight leading processing.

The control unit 11 includes a balance determining module 21, an assistance executing module 22, and a processor 23. The processor 23 is configured to execute the balance determining module 21 and the assistance executing module 22 to perform their respective functions. These modules are stored in internal memory (e.g., memory 13) as one or more software programs. The memory 13 stores drive history data 24, a change table 25, a drive control program, and a reference traveling route generation model. The drive history data 24 is the sensor data and accumulated data calculated based on the sensor data.

The balance determining module 21 determines a matching state (balance state) between the current driving performance P (current driving ability) and the driving demand D (required driving ability) on the basis of a given physical quantity obtained based on the sensor data. The balance state indicates an excess/deficiency state of the driving demand D with respect to the driving performance P. In this embodiment, the given physical quantity relates to the driving operation by the driver. Hereinafter, an example in which this physical quantity is a difference between a reference traveling route and an actual traveling route is described.

Further, the assistance executing module 22 performs processing of increasing/reducing the driving demand D and the driving performance P based on the change table 25 according to the determined balance state.

First, as illustrated in FIG. 4, the balance determining module 21 calculates, every given period of time (e.g., 0.1 seconds), a reference traveling route Ra in a given period of time (e.g., 2 to 4 seconds) from a current timing by using the reference traveling route generation model, based on the traffic environment and a current vehicle state specified by the sensor data. The reference traveling route Ra is specified by a reference position (Pk) and a reference speed (Vk) of the vehicle V on the reference traveling route (k=0, 1, 2, . . . , n). Note that although the traveling route is defined by the position and the speed in this embodiment, it may be defined only by the position, or may be defined by the position, the speed, and other additional element(s) (a longitudinal acceleration, a lateral acceleration, a yaw rate, etc.).

In FIG. 4, a vehicle V having a width $W_V$ travels on a road 30 including a straight zone 30a, a curve zone 30b, and another straight zone 30c. The road 30 has left and right traffic lanes 30L and 30R. A case is considered where the vehicle V currently travels on the traffic lane 30L of the straight zone 30a.

As the traffic environment, a shape of the road 30 (a straight line, a curve, a traffic lane width, etc.), the traffic participants (the preceding vehicle, etc.), a traffic regulation (a traffic sign, etc.), etc. are specified. In order to specify the traffic environment, image data obtained by the external camera, speed and position data of the preceding vehicle, etc. obtained by the radar, map data obtained by the navigation device, etc. are used. In the example of FIG. 4, both traffic lane ends 31L and 31R, a traffic lane width W, the number of traffic lanes, a curvature radius L, the traffic sign (speed limit), etc. are specified based on the image data, the map data, etc.

As the current vehicle state, a current vehicle speed, an acceleration/deceleration, a set vehicle speed, etc. are specified. For determining the current vehicle state, the sensor data (the vehicle speed, the longitudinal acceleration, the lateral acceleration, the yaw rate, an accelerator opening, an engine speed, an AT gear position, a brake switch, a brake pressure, a steering angle, a steering torque, etc.) obtained by the vehicle behavior sensor and the driver operation detection sensor is used.

In the example of FIG. 4, the reference traveling route Ra is set along the reference traveling route generation model so that, by having the speed limit (the speed limit read from image data of the traffic sign, or the set speed) as an upper limit speed, the vehicle V keeps traveling near the center of the traffic lane 30L in the straight zones 30a and 30c, and the vehicle V travels on the inner side of the center of the lane 30L in the width direction in the curve zone 30b. Note that the reference traveling route Ra may be set so that the vehicle always travels near the center of the traffic lane.

Further, the balance determining module 21 calculates an actual traveling route Rb in which the vehicle V actually traveled, based on the sensor data. Moreover, the balance determining module 21 functioning as a travel safety determining module compares the reference traveling route Ra and the actual traveling route Rb. In this comparison, the difference between the actual traveling route Rb and the reference traveling route Ra is evaluated by a given evaluation method. The evaluation items are position and speed.

In the position evaluation, a difference in position, that is, a shifted amount (deviation distance) from the reference position (Pk) of the reference traveling route Ra to the actual traveling route Rb in the width W direction is evaluated. In the speed evaluation, a difference in speed, that is, a difference of an actual speed on the actual traveling route Rb from the reference speed (Vk) of the reference traveling route Ra is evaluated. The differences in the position evaluation and the speed evaluation are added to calculate the travel safety index (see FIG. 5). Note that the longitudinal acceleration, the lateral acceleration, the yaw rate, etc. may be added as the evaluation items. The balance determining module 21 continuously calculates this travel safety index and stores it in the memory 13 as the drive history data 24.

Note that in the position evaluation, the travel safety is evaluated to be lower as the positional difference is larger. Further, in the speed evaluation, the travel safety is evaluated to be lower as the speed difference is larger in the positive direction. Therefore, the travel safety is evaluated to be lower as the difference between the reference traveling route Ra and the actual traveling route Rb is larger.

FIG. 5 shows a situation where the travel safety index fluctuates as fluctuations $F_1$ and $F_2$ over time between a highest value H (high safety) and a lowest value L (low safety). When the vehicle V travels completely following the reference traveling route Ra, the calculated travel safety index becomes the highest value H (e.g., "100") as indicated by a line $F_H$ (no fluctuation over time). On the other hand, when the vehicle V travels while greatly deviating from the reference traveling route Ra, the calculated travel safety index becomes close to the lowest value L (e.g., "0"). Further, in this case, as indicated by a line $F_L$, the travel safety index fluctuates over time according to the fluctuation of the deviation over time with respect to the reference traveling route Ra.

The travel safety index is an index by using the reference traveling route Ra as a reference, and expressing a degree of travel safety to a certain extent. However, depending on the driver's preference or habit, he/she does not necessarily travel on the reference traveling route Ra. For example, a certain driver prefers to travel at a leftward position rather than the center of the traffic lane. Therefore, the travel safety index calculated for a driver having a high driving skill may not necessarily be high.

In this regard, the present inventors found that when the driving performance P and the driving demand D are in the balanced state (P=D), the fluctuation of the travel safety index over time tends to be small regardless of the driving performance P (substantially, the driving skill). According to this knowledge, the fluctuation $F_1$ indicates a state where the driving performance P and the driving demand D are substantially in balance. That is, in the fluctuation $F_1$, the difference between the driving performance P and the driving demand D continuously remains small. On the other hand, the fluctuation $F_2$ indicates an unbalanced state (particularly, P<D).

Therefore, by analyzing the fluctuation of the travel safety index over time, the balance state of the driving performance P and the driving demand D are determined. For this reason, the balance determining module 21 determines the balance state based on a current value and a reference value (e.g., a given base line $F_B$) of the travel safety index. For example, by taking into consideration a fluctuation tendency of the travel safety index in a given period of time T (e.g., 5 to 10 minutes), the balance determining module 21 determines the balance state based on a fluctuation width of the travel safety index (e.g., an upper fluctuation width and a lower fluctuation width from the given base line $F_B$). Note that the given time period T may be traveling time of a given distance (e.g., 5 to 10 km).

The base line $F_B$ may be an average value of the fluctuation of the travel safety index over time while traveling for a given period of time (e.g., 10 to 20 minutes) or a given distance (e.g., 5 to 10 km). Further, an average value for a period during which that the fluctuation of the travel safety index over time is evaluated to be stable (e.g., the fluctuation width is smaller than a threshold width) may be set to the base line $F_B$. Moreover, the base line $F_B$ may be set based on the fluctuation of the travel safety index over time for a given time period in the past, which is included in the drive history data 24.

In FIG. 5, in the given time period T, the fluctuation $F_1$ has a fluctuation width $G_1$ and the fluctuation $F_2$ has a fluctuation width $G_2$. For example, when the fluctuation width is smaller than a given threshold width $G_{th}$, the balance state is determined to be the balanced state ($G_1 \leq G_{th}$), and when the fluctuation width exceeds the given threshold width $G_{th}$, the balance state is determined to be the unbalanced state ($G_2 > G_{th}$).

Further, the base line $F_B$ may be set for various traveling roads (an urban area, a highway, an expressway, etc.), respectively. Therefore, the balance determining module 21 determines, based on the sensor data, a type of the traveling road on which the vehicle V is traveling and, for example, only when traveling in the urban area for a given period of time or a given distance, sets the base line $F_B$ for the urban area. Moreover, the balance determining module 21 may acquire the traveling safety index when traveling in the urban area from the past drive history data 24 to set the base line $F_B$ for the urban area.

Furthermore, the balance state may be determined without using the base line. For example, the balance state may be determined to be the unbalanced state when the difference between the highest value and the lowest value of the fluctuation of the travel safety index over time in a given period of time (e.g., the period T) exceeds a given threshold or when an amplitude of a given cycle component exceeds a given threshold.

The assistance executing module 22 acquires the determination result of the balance determining module 21 and, based on this determination result, performs the processing of increasing/reducing the driving demand D (and processing of increasing/reducing the driving performance P) based on the change table 25. For example, the assistance executing module 22 outputs command signals to the information presentation devices 5, the vehicle drive control system 7, etc. corresponding to the respective processes. The change table 25 has a driving demand increase and reduction table 25A (FIG. 6) and a driving performance increase and reduction table 25B (FIG. 7).

As illustrated in FIG. 6, the driving demand increase and reduction table 25A is classified into increase processing (D UP) and reduction processing (D DOWN) of the driving demand D. Each class further includes small/middle class processes regarding "information-related," "autonomous drive," and "other."

The information-related processing is "information-related drive assistance." The increase processing performed by the information-related processing includes small class processes regarding "bird's-eye information presentation," "information amount increase," and "line-of-sight leading." The reduction processing performed by the information-related processing includes small class processes regarding "local information presentation," "information amount reduction," and "line-of-sight leading." Each of the small classes includes a plurality of processes. The increased or reduced amount of the driving demand D (the information-related factor Di or the autonomous driving factor Dd) by each processing is scored (not illustrated but examples of the general value are described in the middle classes). By performing the plurality of processes, the driving demand is reduced or increased by the amount corresponding to the total score thereof.

In the information-related processing, processing of facilitating or obstructing comprehension of the traffic situation by the driver is performed. Thus, the difficulty of the driver comprehending the traffic environmental situation is controlled and the driving demand D is increased/reduced accordingly. That is, while driving, the driver needs to instantly process necessary information. Therefore, when the information presentation is narrowed to required information for a driving operation concerned, since comprehending the situation becomes easy, the driving demand D drops (the reduction processing performed by facilitating comprehension of the traffic situation). On the other hand, when detailed information is presented, since comprehending the situation becomes difficult, the driving demand D rises (the increase processing performed by obstructing comprehension of the traffic situation).

The bird's-eye information presentation processing includes processing of controlling the navigation device 5A to display the map in a bird's-eye-view (broad view) presentation mode on a navigation screen. On the other hand, the local information presentation processing includes processing of controlling the navigation device 5A to locally display the navigation map. For example, as illustrated in FIG. 8, when the current map is displayed in an intermediate scale (see Part (B) of FIG. 8), the driving demand D is increased by reducing a display scaling level to display a wide area (display a bird's-eye-view; see Part (A) of FIG. 8), and the driving demand D is reduced, on the contrary, by raising the display scaling level to display a local area (display a local view: see Part (C) of FIG. 8). That is, it is evaluated that the degree of the drive assistance increases as the scale of the map shifts from the bird's-eye-view (detailed) to the local view (simplified). In the driving demand increase and reduction table 25A, the increase/reduction amount (score) of the driving demand D corresponding to the change of the display scaling level is defined.

Another example of the bird's-eye information presentation processing includes processing of controlling the navigation device 5A or other information presentation devices to display the following information in the bird's-eye-view: guidance for a traveling lane located ahead of a turn at an intersection guided in a route guidance; no intersection enlarged view in a route guidance at a right/left turn; a traveling lane guidance display on a list of traffic lanes; brief stop indication/railroad crossing indication/merge indication/lane reduction indication/frequent accident occurring point indication on guidance display; voice guidance for traffic jam information; voice guidance for multiple curve information, etc. By these processes, the information amount for the driver to process increases, and a demand for comprehending the situation increases. Note that the added information includes low priority information (e.g., traffic jam information).

Another example of the local information presentation processing includes processing of controlling the navigation device 5A or other information presentation devices to display the following information: an intersection enlarged view in a route guidance at a right/left turn; a complex intersection enlarged view; a grade-separated intersection enlarged view; a narrow road guidance display; an on-ramp image display, etc. By these processes, it becomes easy to comprehend the intersection and the road shape, and a demand for comprehending the situation (comprehending the shape) drops.

Still another example of the bird's-eye information presentation processing includes processing of controlling the navigation device 5A to change, on the navigation screen, the presentation mode of traffic information on a zone from a current position to an estimated arrival point after a set period of time (e.g., traffic jam state, estimated passing time, etc. of at each passing point). For example, it is extension processing of the current set period of time. Specifically, the presentation of traffic information for 60 minutes from a current time point is changed to presentation of traffic information for two hours. Still another example of the local information presentation processing is, contrary to the previous example, presentation processing of traffic information on a smaller zone. For example, the presentation of traffic information for 60 minutes from the current time point is changed to presentation of traffic information for 30 minutes.

The information amount increase processing includes processing of controlling the information presentation device 5 to perform the following processing, for example: turning on a given display lamp; switching a display mode of a given display device (from the simplified view to the detailed view); increasing a displayed number of continuous curves (displaying up to the second curve); and lowering a threshold for drive assistance alarm issuance. By these processes, the information amount for the driver to process and the number of confirmations (decisions, controls, etc.) increases. The drive assistance alarm suggests the driver to take a break based on a determination of fatigue and declined attentiveness of the driver by using the image data (in the processing described above, a determination threshold for fatigue or attentiveness declination is lowered), or informs of a vehicle approach from the rear side (in the processing described above, an approach determination threshold distance is extended).

The information amount reduction processing is processing of reducing the information presentation amount to the driver and includes processing of controlling the information presentation device 5 to perform the following processing, for example: turning off a given display lamp (an operation lamp of a driving skill evaluation device); changing the location of the information display from a meter panel to the HUD 5C; switching a display mode on a given display device (from the detailed display to the simplified display); and raising the threshold for the drive assistance alarm issuance. Note that the display mode switch includes stopping the information display itself and reducing the number of displayed information items. By these processes, the low priority information is no longer displayed and the information amount for the driver to process decreases. Moreover, by changing the display location from the meter panel to the HUD 5C, a demand for shifting the line of sight to the meter panel (looking down) drops.

Further, the line-of-sight leading processing is processing of controlling activation/deactivation of the line-of-sight leading device that promotes changing the viewing direction of the driver. By activating the line-of-sight leading device, comprehension of the traffic situation by the driver is facilitated. Note that the line-of-sight leading processing has an effect for reducing the driving demand D and enhancing the driving performance P.

As illustrated in FIG. 9, the line-of-sight leading device 5E is provided on a dashboard of the vehicle V and emits a spot light 9a upwardly to generate a line-of-sight leading point (eye point) 9b on a windshield 9. By viewing outside the vehicle through the line-of-sight leading point 9b, a line of sight C of a driver E is led to a given position ahead of the vehicle (e.g., around 150 to 250 m, or 200 m, ahead of the vehicle). The generation position of the line-of-sight leading point 9b is set according to the position (e.g., height position) of the eye of the driver E. Further, the on-board controller 1 may estimate the eye position based on the image data of the driver E obtained by the in-vehicle camera 3a, and output a command signal so that the line-of-sight leading point 9b is generated at a suitable position. In this case, the line-of-sight leading device 5E adjusts an emission angle of the spot light 9a based on this command signal.

Generally, a driver with low driving skill has his/her line of sight at a position close to the vehicle (e.g., within 50 m ahead of the vehicle), and therefore, the level of comprehension of the traffic situation is low, and the understanding and time for responding to a change in the traffic situation is low and short, respectively. On the other hand, it is known that a driver with high driving skill has his/her line of sight at a far position from the vehicle (e.g., around 150 to 250 m ahead of the vehicle). With this line of sight, the traffic situation is easily comprehended and the driver reacts to the change in the traffic situation with sufficient understanding and time.

Note that the on-board controller 1 may calculate the line of sight based on the image data of the driver E obtained by the in-vehicle camera 3a. In this case, when the line of sight of the driver E is detected at the close position, the on-board controller 1 causes the line-of-sight leading device 5E to emit the spot light 9a. Further, in order to lead the line of sight to an even farther position in a stepwise fashion, the line-of-sight leading device 5E may change the emitting direction of the spot light 9a in a stepwise fashion.

The autonomous drive processing is "autonomous drive assistance." The autonomous drive processing includes processing of selectively implementing one or more of the plurality of autonomous drive assistance modes (the lane keeping assistance mode, the automatic speed control mode, and the preceding vehicle following mode) by the on-board controller 1. The driving demand D drops in this manner. On the other hand, the driving demand D is increased by deactivating the activated autonomous drive assistance mode. Generally, compared to the information-related processing and the other processing, the effect of the autonomous drive processing on the increase and reduction of the driving demand D is larger and the change amount (score) is larger.

Note that the autonomous drive assistance mode may include a hill-start assistance mode (prevent rolling to the opposite direction from a traveling direction when start traveling on a hill). Further, for example, in the automatic speed control mode, the driving demand D is increased by automatically raising the set speed, and the driving demand D is reduced by automatically lowering the set speed. In another example, to reduce the driving demand D, a determination threshold for executing a lane departure preventing control is changed so that it is executed when the vehicle is located far from a boundary of the traffic lane. On the other hand, to increase the driving demand D, the determination threshold is changed so that the lane departure preventing control is executed when the vehicle is located close to the boundary of the traffic lane.

The other processing includes processing of controlling the navigation device 5A to preferentially select a difficult route (e.g., with many curves) in the route search processing. The driving demand D increases in this manner. Further, the driving demand D may be reduced by causing the information presentation devices 5 to perform processing of performing voice guidance for the timing to change the traffic lane or processing of presenting guidance for taking a break suitably.

Moreover, as illustrated in FIG. 7, the driving performance increase and reduction table 25B is classified into increase processing (P UP) and reduction processing (P DOWN) of the driving performance P. The increase processing is, for example, processing of controlling the audio device to output music from the speaker to relax the driver, processing of controlling an air conditioner to release a flow of air with relaxing scent, processing of controlling the information presentation devices 5 to display or output an audio of a message suggesting the driver to take a break, processing of changing the seat position to lower the fatigue of the driver, etc. The reduction processing is not particularly specified. The increase of the driving performance P is achieved by cutting down the degraded amount caused by the physical factor Pp and the mental factor Pm.

Figure 10:
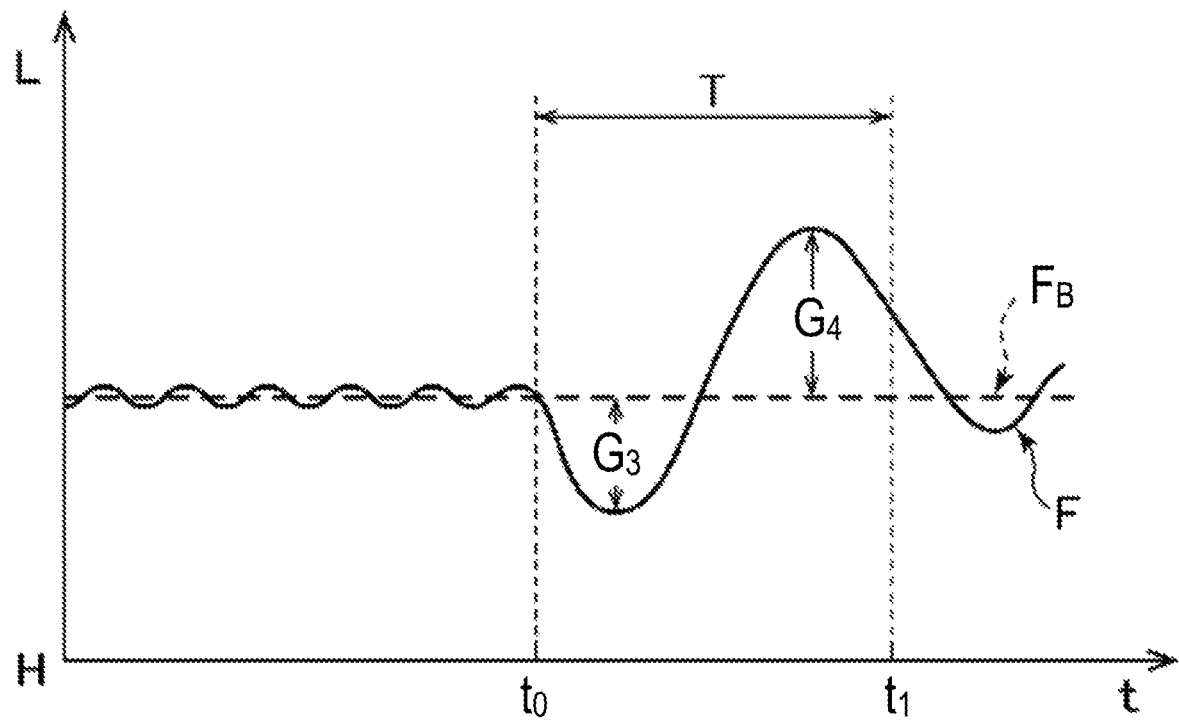
FIG. 10 is a time fluctuation chart of a travel safety index according to the embodiment of the present disclosure.
Figure 11:
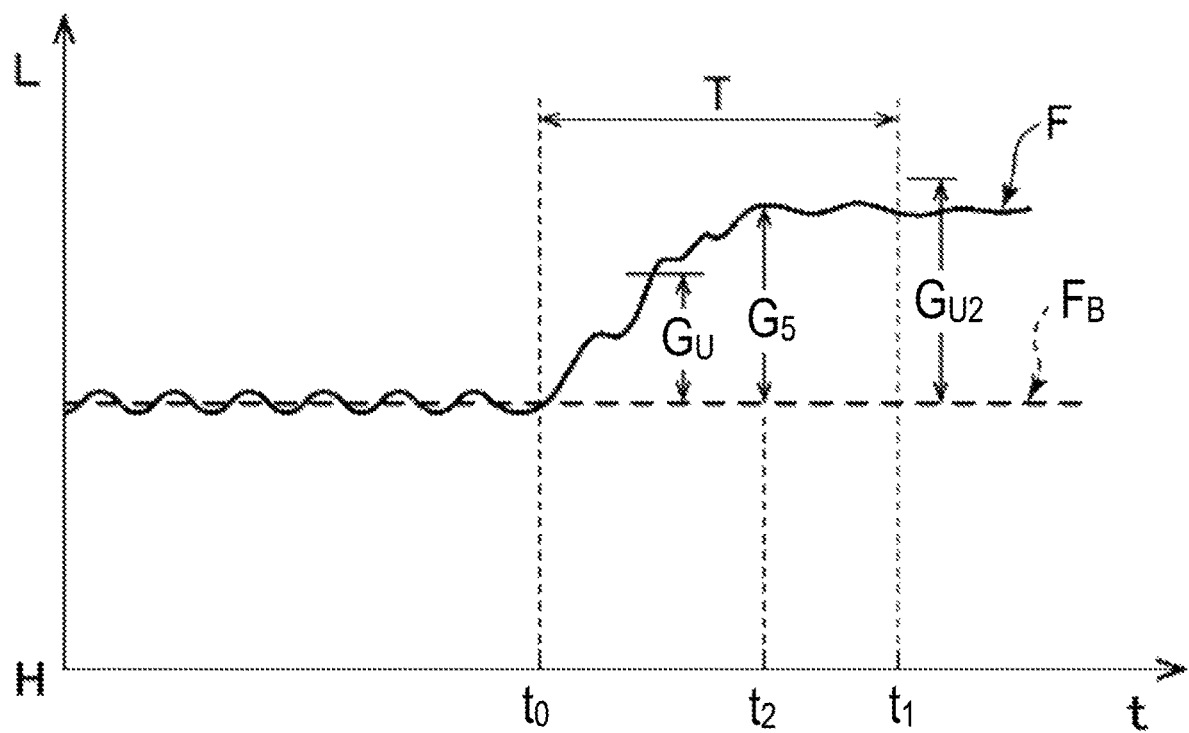
FIG. 11 is a time fluctuation chart of the travel safety index according to the embodiment of the present disclosure.
Figure 12:
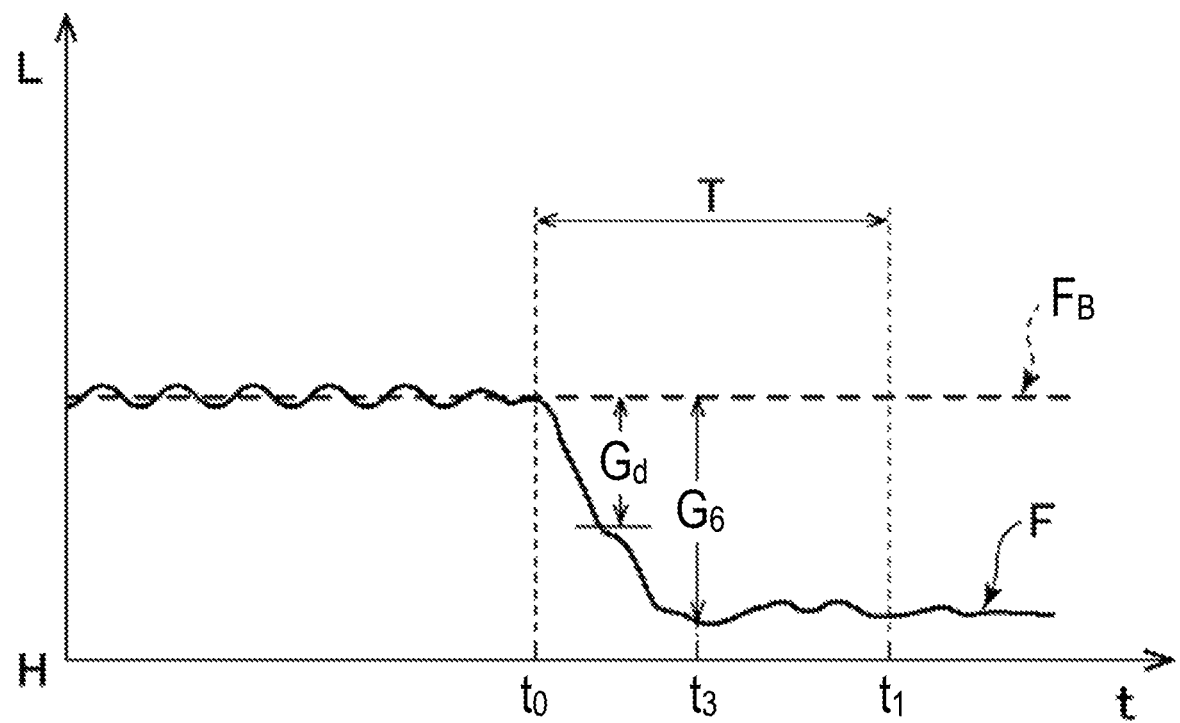
FIG. 12 is a time fluctuation chart of the travel safety index according to the embodiment of the present disclosure.
Figure 13:
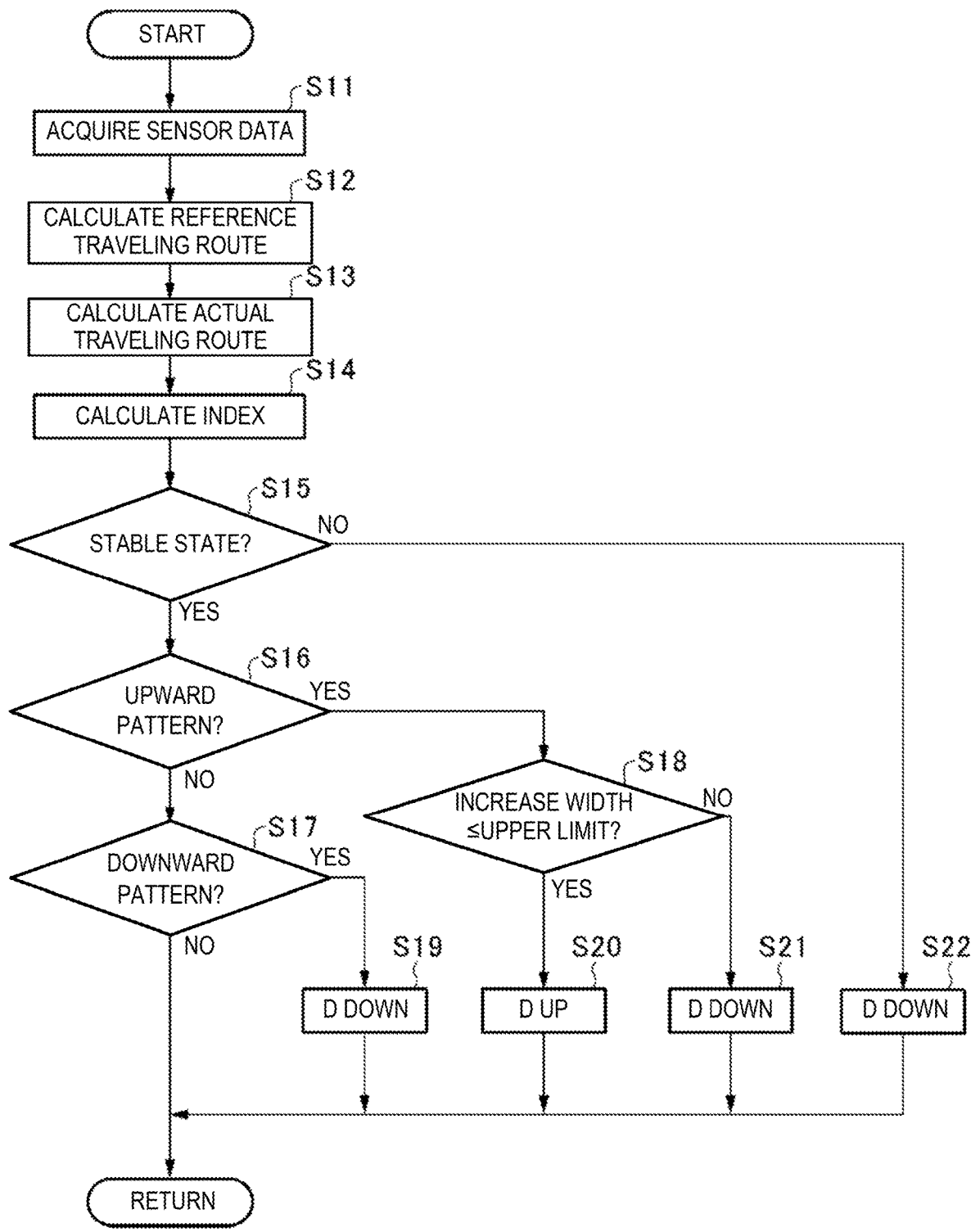
FIG. 13 is a flowchart of drive assistance processing according to the embodiment of the present disclosure.

Next, processing of the vehicle drive assistance system is described with reference to FIGS. 10 to 13. FIGS. 10 to 12 are time fluctuation charts of the travel safety index, and FIG. 13 is a flowchart of the drive assistance processing.

First, a typical fluctuation of the travel safety index over time is described with reference to FIGS. 10 to 12.

In FIG. 10, the travel safety index is in the stable state until a timing $t_0$, then the fluctuation width (fluctuation widths $G_3$ and $G_4$) during the given time period T between the timing $t_0$ and a timing $t_1$ becomes higher than the threshold width $G_{th}$ in the high and low directions of the base line $F_B$.

Therefore, in FIG. 10, the balance determining module 21 evaluates that the driving performance P and the driving demand D are in the balanced state until the timing $t_0$, and evaluates that they are in the unbalanced state after the timing $t_0$. That is, the balance determining module 21 determines that the driving demand D exceeds the driving performance P ("P<D" determination) due to a change in the traffic environment, the physical condition, etc. after the timing $t_0$. Based on this determination result, the assistance executing module 22 performs the "D DOWN" processing and/or the "P UP" processing.

Further, in FIG. 11, the travel safety index is in the stable state until the timing $t_0$, then it fluctuates over time in a given upward fluctuation pattern during the given time period T from the timing $t_0$ to the timing $t_1$. That is, the travel safety index increases by a fluctuation width $G_5$ which is larger than a given increase width $G_U$ ($G_5 \geq G_U$) from the timing $t_0$ which is after the stable state to a timing $t_2$, and then returns back into the stable state from the timing $t_2$ to the timing $t_1$. After the timing $t_2$, the fluctuation F is in the stable state at a value lower (L side) than the base line $F_B$.

Note that for example, the fluctuation F in the analyzing time period is determined to be in the stable state when an amplitude of a given cycle range does not exceed a certain threshold amplitude (e.g., the threshold width $G_{th}$) by a frequency analysis of the fluctuation F in a given analyzing period of time (<T).

Therefore, in FIG. 11, the balance determining module 21 evaluates that the driving performance P and the driving demand D are in the balanced state until the timing $t_0$, and evaluates that they are in the unbalanced state from the timing $t_0$ to the timing $t_2$ but return back into the balanced state again after the timing $t_2$. However, after the timing $t_0$, since the driver intentionally increases the driving performance P, it is considered that the driver is performing the driving operation which causes the driving demand D to increase, e.g., in a state where the driver intentionally drives at a speed higher than a normal speed.

In this case, the balance determining module 21 determines that this balanced state is a result of "upward fluctuation pattern" (the driving demand "increase allowed state" determination). The assistance executing module 22 performs the "D UP" processing based on this determination result. Thus, the driving demand D increased to approach the driving performance P desired by the driver. Due to the increase of the driving demand D, for example, the driver decelerates the vehicle.

Note that even in "upward fluctuation pattern," when the fluctuation width $G_5$ exceeds a given upper limit increase width $G_{U2}$, the value of the travel safety index is excessively low (L side). In this case, the balance determining module 21 determines that the safety if decreasing (the driving demand "reduction recommended" determination). The assistance executing module 22 performs the "D DOWN" processing based on this determination result. By the reduction of the driving demand D, for example, even if the driver maintains the intentionally raised speed, the driving workload decreases. Thus, the travel safety is prevented from dropping.

Further, in FIG. 12, the travel safety index is in the stable state until the timing $t_0$, then it fluctuates over time in a given downward fluctuation pattern during the given time period T from the timing $t_0$ to the timing $t_1$. That is, the travel safety index decreases by a fluctuation width $G_6$ which is larger than a given decrease width $G_d$ ($G_6 \geq G_d$) from the timing $t_0$ which is after the stable state to a timing $t_3$, and then returns back into the stable state from the timing $t_3$ to the timing $t_1$. The fluctuation F is in the stable state at a value higher (H side) than the base line $F_B$ after the timing $t_3$.

Therefore, in FIG. 12, the balance determining module 21 evaluates that the driving performance P and the driving demand D are in the balanced state until the timing $t_0$, and evaluates that they are in the unbalanced state from the timing $t_0$ to the timing $t_3$ but returns back into the balanced state again after the timing $t_3$. However, after the timing $t_3$, it is considered that the driver is intentionally performing the driving operation that causes the driving demand D to decrease in order for the driver to drive without any problem even when the driving performance P decreases, e.g., a state where the driver drives more carefully (at a low speed) than normally due to a poor physical condition.

In this case, the balance determining module 21 determines that the balanced state is a result of "downward fluctuation pattern" (the driving demand "reduction allowed state" determination). The assistance executing module 22 performs the "D DOWN" processing based on this determination result. Thus, the driving demand D decreases, therefore, for example, the driver can respond to a sharp increase of the driving demand D due to a change in the traffic environment thereafter.

The on-board controller 1 (control unit 11) repeatedly performs the drive assistance processing illustrated in FIG. 13. First, the control unit 11 (balance determining module 21) acquires the sensor data from the vehicle sensor 3 (S11) and calculates the reference traveling route Ra (S12) and the actual traveling route Rb (S13) based on the sensor data. Further, based on the reference traveling route Ra and the actual traveling route Rb, the control unit 11 calculates the current travel safety index and stores it as the drive history data 24 (S14).

Further, the control unit 11 evaluates the fluctuation of the travel safety index in the given time period T in the past until the current timing (S15 to S18). At S15, whether the travel safety index is in the stable state (i.e., whether the fluctuation width of the fluctuation F is smaller than the given threshold width from the base line) is determined. At S16, whether the fluctuation F has the upward fluctuation pattern over time is determined. At S17, whether the fluctuation F has the downward fluctuation pattern over time is determined. If the fluctuation F has the upward fluctuation pattern over time (S16: YES), at S18, whether the increase width of the fluctuation F exceeds the upper limit increase width is determined. Note that the process may be terminated if the travel safety index is continuously increasing or decreasing and does not belong any of the states at S15 to S18.

If the fluctuation of the travel safety index is in the stable state (S15: YES) but does not have the upward fluctuation pattern (S16: NO) nor the downward fluctuation pattern (S17: NO), the driving performance P and the driving demand D are in the balanced state, therefore the control unit 11 terminates the process without performing the "D UP" processing and the "D DOWN" processing.

If the fluctuation of the travel safety index is in the stable state (S15: YES) and has the upward fluctuation pattern (S16: YES) and the increase width is smaller than the upper limit increase width (S18: YES), it is considered that the driver is intentionally increasing the driving performance. Therefore, the control unit 11 selects and performs suitable one or more of the processes from the "D UP" processing (S20), and terminates the process. Note that in this case, the information-related processing (the bird's-eye information presentation and information amount increase processes) is preferentially selected over the autonomous drive processing.

Further upon execution of the "D UP" processing, the control unit 11 reduces an activation threshold of a given safety equipment of the vehicle V. For example, the activation threshold is lowered so that an automatic break of a collision avoidance system is easily activated. Thus, the automatic break is activated at a farther inter-vehicle distance to the preceding vehicle. Further, the inter-vehicle distance at which a proximity alarm is issued is set to a longer distance. As another safety equipment, in the lane keeping assistance mode, a lateral-direction threshold (position) is narrowed so that an automatic steering assist function is activated to bring the vehicle V toward the center of the traffic lane. Thus, the driving demand D is increased without lowering the safety.

If the fluctuation of the travel safety index is in the stable state (S15: YES) and has the upward fluctuation pattern (S16: YES) and the increase width exceeds the upper limit increase width (S18: NO), the travel safety may degrade. Therefore, the control unit 11 selects and performs suitable processing from the "D DOWN" and/or "P UP" processing (S21), and terminates the process.

If the fluctuation of the travel safety index is in the stable state (S15: YES) and does not have the upward fluctuation pattern (S16: NO) but has the downward fluctuation pattern (S17: YES), it is considered that the driving performance P is degrading. Therefore, the control unit 11 selects and performs suitable processing from the "D DOWN" and/or "P UP" processing (S19), and terminates the process.

If the fluctuation of the travel safety index is not in the stable state (S15: NO), the driving performance P and the driving demand D are in the unbalanced state, and particularly the driving demand D exceeds the driving performance P. Therefore, the control unit 11 selects and performs suitable processing from the "D DOWN" and/or "P UP" processing (S22), and terminates the process.

Note that in this embodiment, the balance state between the driving performance P and the driving demand D is determined based on the fluctuation of the travel safety index, and the processing of increasing/reducing the driving demand D and the driving performance P is performed. However, since the driving performance P is temporarily constant for a short period of time, the fluctuation of the travel safety index is assumed as the fluctuation of the driving demand D. Therefore, in this embodiment, the fluctuation of the driving demand D may be evaluated to provide the drive assistance.

Hereinafter, modifications of this embodiment are described.

Although in this embodiment the travel safety index related to the traveling route is used as the physical quantity related to the driving operation by the driver, without limiting to this, another physical quantity may be used. The other physical quantity is, for example, an upper body position of the driver, a steering angle, or a visual confirmation performing state of the driver.

The upper body position of the driver may be detected from image data of the driver captured by the in-vehicle camera. The upper body position is a position in front-and-rear directions and lateral directions of the upper body of the driver with respect to a seat position. The balance state between the driving performance P and the driving demand D is determined based on a fluctuation of the upper body position over time. That is, when the longitudinal acceleration and the lateral acceleration are applied while driving, if the driver comprehends the driving operation situation and controls him/herself, an amount of sway of the upper body becomes small. In the balanced state, an amplitude of the sway of the upper body becomes substantially constant. Therefore, the amount of the sway of the upper body of the driver becomes the index for balance. Similar to the travel safety index of the embodiment, the index based on the upper body position is also determined based on the amount of the sway with respect to the base line of each driver.

For the steering angle, the steering angle data detected by the steering angle sensor may be used. The balance state between the driving performance P and the driving demand D is determined based on a fluctuation of the steering angle over time. That is, if the driver controls a steering wheel stably and smoothly so that the vehicle V travels along an intended route, a magnitude of a fluctuation component which is lower than a given cycle included in the fluctuation of the steering angle becomes small. In the balanced state, the magnitude of the fluctuation component lower than the given cycle becomes substantially constant. Therefore, the fluctuation of the steering angle over time becomes the index for balance. Similar to the travel safety index of the embodiment, the index indicated by the steering angle is also determined based on the magnitude of the fluctuation with respect to the base line of each driver.

The visual confirmation performing state of the driver is a state of safety check of obstacles outside the vehicle (e.g., the traffic participant) by the driver, that is, a visual confirmation rate of the obstacles existing forward, on the sides, rearward of the vehicle V. For example, the control unit 11 identifies the existence of the obstacles (including the number and positions thereof) based on the image data obtained by the external camera and the external object data obtained by the radar. Further, the control unit 11 continuously identifies the line of sight of the driver based on the image data of the driver obtained by the in-vehicle camera. Thus, the control unit 11 determines whether the driver has visually confirmed the identified obstacles. Based on this determination, the control unit 11 calculates a fluctuation over time of the visual confirmation rate (visual confirmation performing state) of the driver on the obstacles. In the balanced state, at every given time interval, the visual confirmation rate expressing the number of obstacles outside the vehicle actually visually confirmed with respect to a large number of obstacles is substantially constant. Similar to the travel safety index of the embodiment, the index indicated by the visual confirmation performing state of the obstacles is also determined based on the magnitude of the fluctuation with respect to the base line of each driver.

Next, effects of the vehicle drive assistance system of this embodiment are described.

The vehicle drive assistance system S of this embodiment includes the control unit 11 configured to perform the drive assistance control based on the balance state between the driving demand D (required driving ability) required for the driver to drive the vehicle V based on the traffic environment around the vehicle and the drive assistance which is provided to the driver by the vehicle V, and the driving performance P (current driving ability) of the driver. The control unit 11 includes the processor 23 configured to execute the balance determining module 21 to determine the balance state between the driving demand D and the driving performance P based on the physical quantity related to the driving operation by the driver.

Therefore, in this embodiment, the balance state between the driving demand D and the driving performance P is determined based on the physical quantity related to the driving operation actually executed by the driver. Thus, the balance state between the driving demand D and the driving performance P is determined more accurately.

Further, for example, the physical quantity is the difference between the reference traveling route Ra defined by at least the position calculated based on the traffic environment and the actual traveling route Rb actually traveled by the vehicle V. When the fluctuation over time of the difference between the reference traveling route Ra and the actual traveling route Rb (travel safety index) is smaller than the given threshold, the balance determining module 21 determines that the driving demand D and the driving performance P are in balance.

Further, in this embodiment, the balance determining module 21 sets the base line $F_B$ of the difference based on the fluctuation over time of the difference between the reference traveling route Ra and the actual traveling route Rb (travel safety index) in traveling for the given time period (e.g., 10 to 20 minutes) or traveling for the given distance (e.g., 5 to 10 km), and determines the balance state based on the base line $F_B$ and the difference (travel safety index).

Further, in this embodiment, when the base line $F_B$ differs from the difference (travel safety index) by less than the given threshold, the balance determining module 21 determines that the driving demand D and the driving performance P are in balance. Moreover, the base line $F_B$ is set when the vehicle V travels the given traveling route. The given traveling route includes a plurality of different traveling routes, and the base line $F_B$ is set for each traveling route.

Further, in this embodiment, the balance determining module 21 is further configured to determine that the travel safety of the vehicle V to be lower as the difference between the reference traveling route Ra and the actual traveling route Rb (travel safety index) is larger. When the fluctuation over time of the difference between the reference traveling route Ra and the actual traveling route Rb is smaller than the given threshold, the balance determining module determines that the driving demand D and the driving performance P are in balance.

Further, in this embodiment, the physical quantity may be one of the upper body position of the driver, the steering angle of the steering wheel, and the visual confirmation performing state of the driver on the obstacle outside the vehicle. The balance determining module 21 determines the balance state between the driving demand D and the driving performance P based on the fluctuation of the physical quantity over time.

Further, in this embodiment, the processor 23 is further configured to execute the assistance executing module 22 to perform the drive assistance control so that the driving demand D and the driving performance P come in balance, based on the determined balance state.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 On-board Controller
3 Vehicle Sensor
5 Information Presentation Device
7 Vehicle Drive Control System
11 Control Unit
13 Memory
21 Balance Determining Module
22 Assistance Executing Module
D Driving Demand
P Driving Performance
Ra Reference Traveling Route
Rb Actual Traveling Route
S Vehicle Drive Assistance System

What is claimed is:

1. A vehicle drive assistance system comprising a control unit configured to perform a drive assistance control based on a balance state between a driver's required driving ability required for driving a vehicle based on a traffic environment around the vehicle and drive assistance which is provided to the driver by the vehicle, and a driver's current driving ability, wherein the control unit includes a processor configured to execute a balance determining module to determine the balance state between the required driving ability and the current driving ability based on a physical quantity related to a driving operation by the driver, wherein the physical quantity is a difference between a reference traveling route defined at least by a position calculated based on the traffic environment, and an actual traveling route on which the vehicle actually traveled in the traffic environment, and wherein the balance determining module sets a base line of the difference based on a fluctuation of the difference between the reference traveling route and the actual traveling route over time in traveling for one of a given period of time and a given distance, and determines the balance state based on the base line and the difference.

2. The vehicle drive assistance system of claim 1, wherein when a fluctuation of the difference between the reference traveling route and the actual traveling route over time is smaller than a given threshold, the balance determining module determines that the required driving ability and the current driving ability are in balance.

3. The vehicle drive assistance system of claim 1, wherein when the base line differs from the difference by less than a given threshold, the balance determining module determines that the required driving ability and the current driving ability are in balance.

4. The vehicle drive assistance system of claim 1, wherein the base line is set when the vehicle travels a given traveling route.

5. The vehicle drive assistance system of claim 4, wherein the given traveling route includes a plurality of different traveling routes, and the base line is set for each traveling route.

6. The vehicle drive assistance system of claim 1, wherein
the balance determining module is further configured to determine a travel safety of the vehicle to be lower as the difference between the reference traveling route and the actual traveling route is larger, and
when the fluctuation of the difference between the reference traveling route and the actual traveling route over time is smaller than a given threshold, the balance determining module determines that the required driving ability and the current driving ability are in balance.

7. The vehicle drive assistance system of claim 1, wherein
the physical quantity is an upper body position of the driver, and
the balance determining module determines the balance state between the required driving ability and the current driving ability based on a fluctuation of the physical quantity over time.

8. The vehicle drive assistance system of claim 1, wherein
the physical quantity is a steering angle of a steering wheel, and
the balance determining module determines the balance state between the required driving ability and the current driving ability based on a fluctuation of the physical quantity over time.

9. The vehicle drive assistance system of claim 1, wherein
the physical quantity is a visual confirmation performing state of the driver on an obstacle outside the vehicle, and
the balance determining module determines the balance state between the required driving ability and the current driving ability based on a fluctuation of the physical quantity over time.

10. The vehicle drive assistance system of claim 1, wherein the processor is further configured to execute an assistance executing module to perform the drive assistance control so that the required driving ability and the current driving ability come in balance, based on the determined balance state.

\* \* \* \* \*